Nov. 22, 1960     H. P. MEYERS     2,961,248
COMBINATION STROLLER AND SWING
Filed Feb. 17, 1958     3 Sheets-Sheet 1
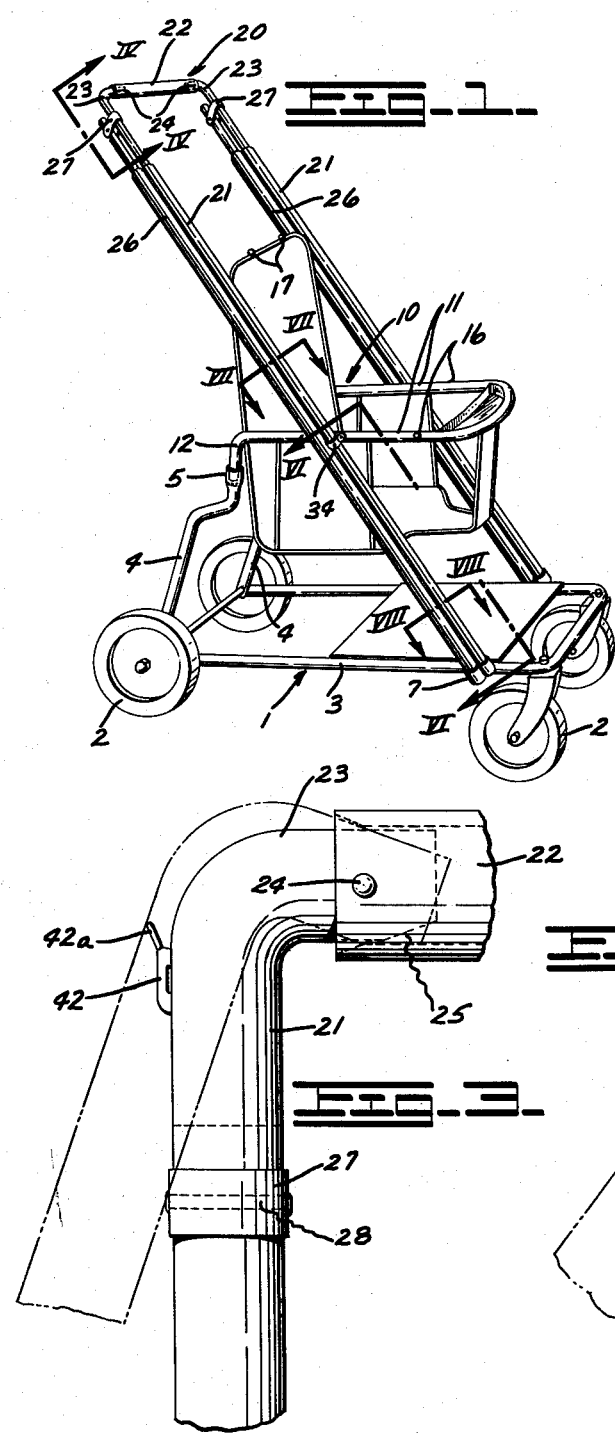
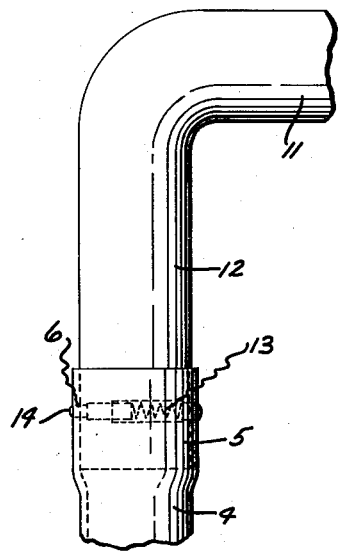
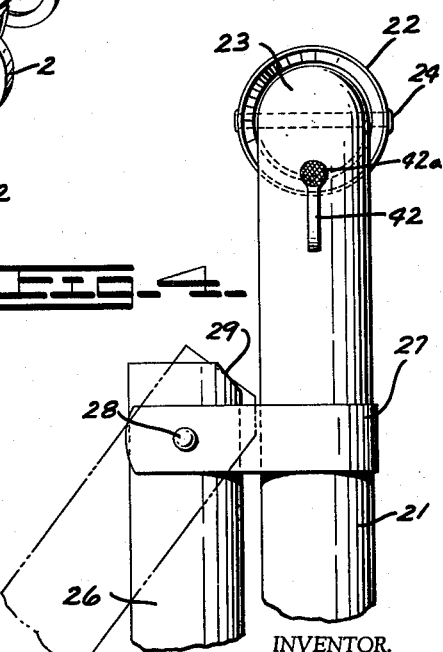
INVENTOR.
Harvard P. Meyers
BY Price and Heneveld

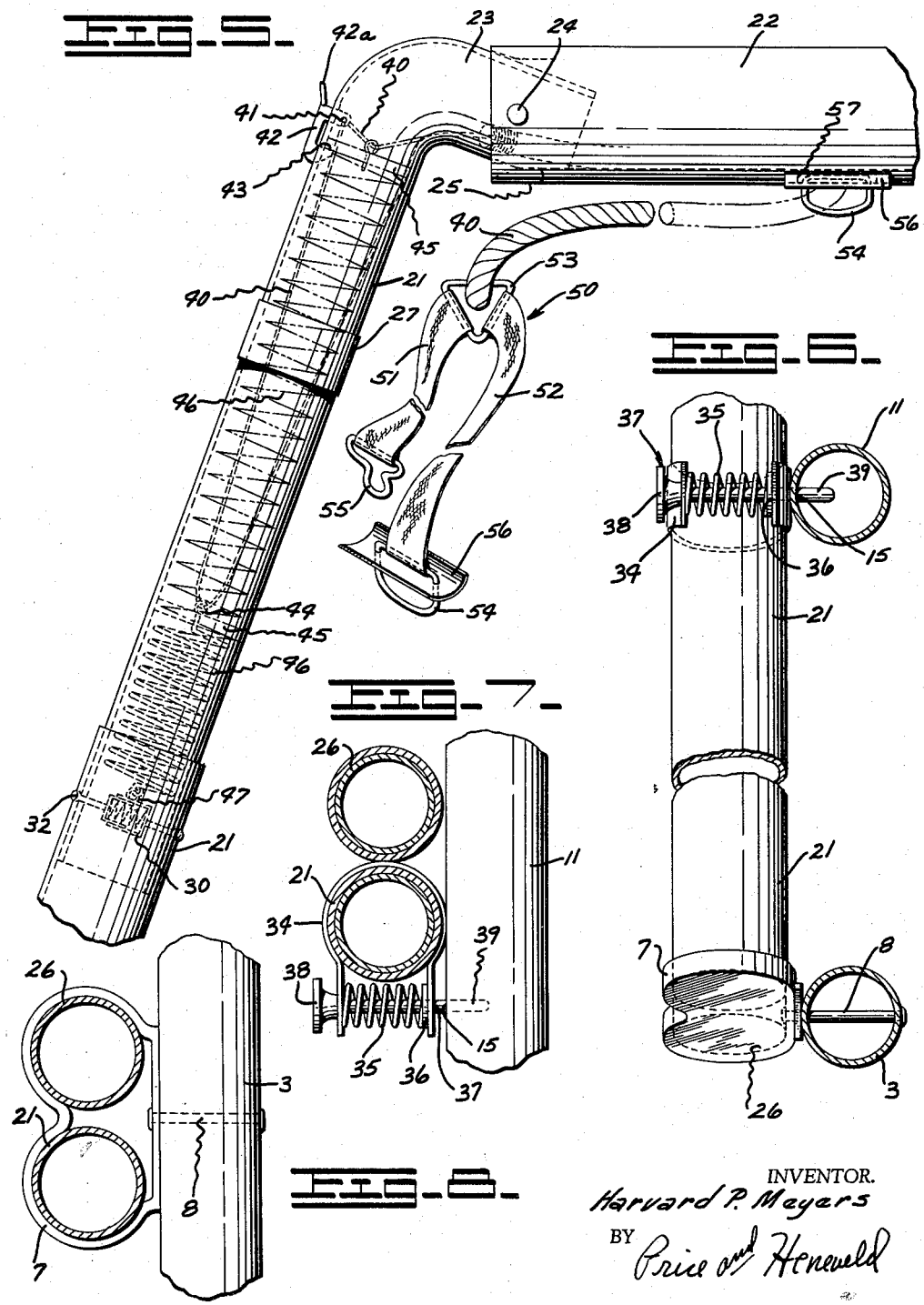

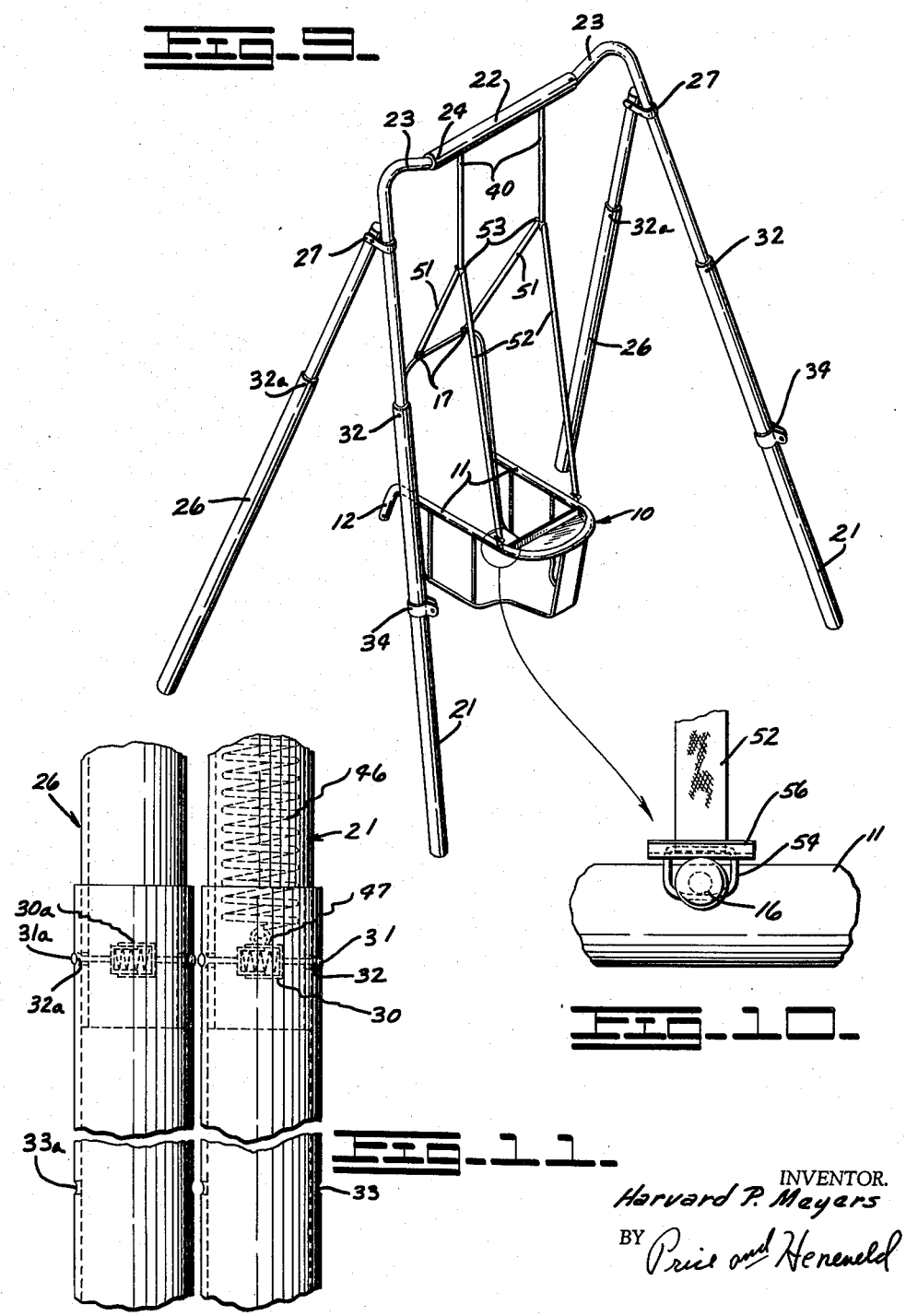

United States Patent Office 2,961,248
Patented Nov. 22, 1960

2,961,248

COMBINATION STROLLER AND SWING

Harvard P. Meyers, 211 Bellevue SW.,
Grand Rapids, Mich.

Filed Feb. 17, 1958, Ser. No. 715,712

7 Claims. (Cl. 280—31)

This invention relates to a combination stroller and swing. More particularly, this invention relates to a baby stroller which can very quickly be converted into a swing within a trellis, no extra parts or tools being needed for the conversion.

Many types of baby strollers are presently in existence. The same can be said for children's swings. However, these strollers and swings are independent units and their structures are not adapted to be combined. Such a combination is quite desirable. The word "stroller" itself implies that its main function is to be utilized as a device for leisurely taking a small child for a walk. These walks are taken when the weather is suitable and oftentimes it is desirable for both adult and child to interrupt the "stroll" at a park or a similar scenic or restful place. However, this often leaves the child unoccupied and the environment is less pleasureable for the adult. Since a swing almost always thoroughly amuses a child and keeps the child occupied, it would be ideal to have a child's swing at hand on these occasions. Children's swings presently in existence could hardly be carried along during the walk. It is therefore an object of this invention to provide a combination baby stroller and swing.

Another object of this invention is to provide a baby stroller, convertible into a child's swing very quickly and very easily.

Another object of this invention is to provide a baby stroller which is convertible into a child's swing without the requirement of tools or extra parts.

Still another object of this invention is to provide such a device which is both simple as well as sturdy in construction.

Other objects of this invention will become obvious to those skilled in the art of strollers and swings upon reading the accompanying specification examination of the accompanying drawings, wherein:

Fig. 1 is an oblique, elevational view of this invention when it is being utilized as a baby stroller.

Fig. 2 shows an arm of the seat detachably mounted to a rear seat support of the carriage.

Fig. 3 is a front elevational view of the portion of this invention shown in Fig. 4.

Fig. 4 is a side elevational view of the top of the handle looking in the direction indicated by IV—IV of Fig. 1.

Fig. 5 is a front, elevational view of the top of the handle when forming a swing trellis and the seat attachment means, certain parts thereof being in phantom to better show these parts of the invention.

Fig. 6 is a cross section taken along the plane VI—VI of Fig. 1.

Fig. 7 is a cross section taken along the plane VII—VII of Fig. 1.

Fig. 8 is a cross section taken along the plane VIII—VIII of Fig. 1.

Fig. 9 is an oblique, elevational view of this invention when it is being utilized as a swing.

Fig. 10 is an enlarged view of the encircled portion of Fig. 9.

Fig. 11 is a side view showing the telescoping means of this invention.

Briefly, this invention relates to a baby stroller, convertible into a swing, including a carriage, seat and a generally inverted U-shaped handle. The seat and handle are detachably mounted on the carriage. The handle is adapted to form a trellis when it is detached from the carriage, and the handle also has means whereby the seat may be suspended within the trellis formed by the handle when the handle and seat are removed from the carriage.

Referring to the drawings, Fig. 1 shows a carriage, designated by the reference numeral 1 with the seat 10 and the handle 20. Fig. 1 shows the invention being utilized as a baby stroller and Fig. 9 shows the baby stroller of Fig. 1 converted into a children's swing.

The general structure of the carriage 1 with the wheels 2 and frame 3 may be any one of the many conventional structures old and well known to the art. I have also provided the rear seat support posts 4, each of which have a cup portion 5 at their tops, with the small openings 6 (Fig. 2) in the side of the cup 5 to facilitate the detachable mounting of the seat 10 on the carriage to be described hereinafter. The cups 7, are mounted on the sides of frame 3. Cups 7 have a shape somewhat like the numeral "eight." Cups 7 are mounted on the frame 3 by bolt and nut assemblies 8, as shown in Figs. 1 and 8. The function of these cups is to receive and support the bottoms of the legs 21 of handle 20 in a manner to be described hereinafter.

The general structure of seat 10 may also be the same as any one of several known structures old and well known to the art. On such a seat 10, I provide the arms 11 which are bent downwardly at the rear of the seat forming the arm portions 12. Within the portions 12 is mounted a small spring detent 13, shown in Fig. 2. The cups of rear support posts 4 are adapted to slidably receive the portions 12 of arms 11 of seat 10, the small knob 14 of spring detent 13 engaging openings 6 in cups 5, thereby providing a simple and secure means of detachably mounting the seat on the rear of the carriage. A small opening 15 is provided in the side of each arm 11, the function of which is to facilitate the detachable mounting of the handle 20 to seat 10 to be described hereinafter. A small button 16 is also provided on each arm 11 of seat 10 (Fig. 10) as well as two buttons 17 on the top of the back of seat 10, the purpose and function of buttons 16 and 17 to also be fully explained hereinafter.

The handle 20 includes the legs 21 and the web or grip 22. The parts comprising the handle 20 are of a tubular construction, although it should be understood that other constructions may be used and still not depart from the spirit and scope of this invention. The legs 21 are bent at their tops, having the horizontal portions 23, adapted to be slidably inserted into the ends of grip 22 (Fig. 3). The horizontal portions 23 are pivotally secured within grip 22 by means of pin 24. The diameter of portions 23 is smaller than the diameter of grip 22, thus allowing them to pivot in a plane running lengthwise of grip 22 because of the positioning of pin 24 and the flattened bottoms 25 of the ends of portions 23, shown best in Fig. 3. The purpose of this structure will be described along with the assembly and operation of this invention.

The props 26 are pivotally secured to the legs 21 of handle 20 by the clamps 27 and pins 28 (Fig. 4). The clamps 27 are secured near the top of legs 21, positioned so that the props 26 may rotate through a plane perpendicular to the grip 22 by means of pins 28. However, the rotation of the props relative to the legs 21 is limited by their close positioning within the clamp 27, the flattened edge 29 of the top of the prop 26 determining the end point of rotation. The props are of a length such that their bottoms correspond with the bottoms of legs 21 and when the handle is being used on the stroller, the props lying flat against the legs 21.

Both the legs 21 of handle 20 and the props 26 secured to legs 21 are constructed in a manner allowing them to be extended to a greater length when the handle and props are being utilized as a swing trellis or telescoped when the handle is used on the carriage. Both the legs and props include two telescoping portions, best shown in Fig. 11. This is accomplished by having spring detents 30 and 30a mounted within the inside portion of legs 21 and props 26 respectively, each having the knobs 31 and 31a respectively fitting into the holes 32 and 32a of the outer portion of the legs and props respectively when they are extended, and fitting into the holes 33 and 33a of the outer portions of the legs and props respectively when they are in telescoped position. Thus, when the handle and props are used as a trellis, the trellis can be of sufficient height to support a swing, and when the handle is used on the stroller, the assembly can be telescoped so that the grip is the proper height for pushing a stroller.

A brace 34 is mounted on each leg 21, its function being to facilitate the detachable mounting of the handle 20 on the arms 11 of seat 10, as shown in Figs. 6 and 7. Mounted within brace 34, lying on the opposie side of leg 21 relative to prop 26 is the coil spring 35 seated on disk 36. Extending through brace 34 and spring 35 is the pin 37, pin 37 as shown in Figs. 6 and 7. It will be noted that if the head 39 of pin 37 is pulled away from leg 21 of handle 20, the coil spring 35 will be compressed by disk 36, allowing end 38 of pin 37 to escape from opening 15 in arm 11 of seat 10. Thus, a sturdy, yet simple means is provided for detachably securing the handle 20 to seat 10.

Mounted within the handle 20 is a means for suspending the seat 10 within the trellis formed by the legs 21 and props 26 as shown in Fig. 9. This means is best shown in Fig. 5, and includes a cord 40 mounted within each leg 21. Cord 40 is secured in the eye 41 of the catch 42 mounted near the top on the side of a leg 21. The cord extends down the hollow leg 21, through the eye hook 44 mounted on disk 45 and then up to the top of leg 21 where it is connected to strap means 50, to be described hereinafter. Mounted on the bottom of disk 45 is a coil spring 46, having its other end secured to the hook 47 on the spring detent 30. It will be noted that if the disk 45 is moved upwardly, the spring 46 is extended, tending to pull the disk back to a position where the spring is not tensioned.

Strap means 50 includes two leather (or similar material) straps 51 and 52, each mounted on the strap-coupling ring 53, the end of cord 40 also being attached thereto. Strap 52 is longer than strap 51 and has a D-ring 54 on the end thereof adapted to fit under button 16 on the side of arm 11 of seat 10. Strap 51 also has a ring 55 at its end, adapted to fit under one of the buttons 17 on the top of the back of seat 10. Thus, a simple and secure means is provided to detachably secure the seat 10 to the cords 40 extendable from the legs 21.

Mounted on the D-ring 54 is the small plate 56. This plate is of a size and shape such that it fits into opening 57 in the bottom of grip 22 of handle 20. It will now be noted that the cord 40 and strap means 50 are completely hidden from view when the spring 46 is in its normal position. When one wishes to suspend the seat 10 within the trellis formed by the legs 21 and props 26, he pulls D-ring 54 from grip 22 and strap means 50 and cord 40 are pulled through opening 57, the spring 46 is tensioned by the cord 40 pulling disk 45 upwardly. When the disk 45 reaches catch 42, it catches behind the stop 43 of catch 42, thus the disk 45 remains in this position until the button 42a of catch 42 is pushed, which releases disk 45 and spring 46 will pull the disk back to its normal position, thereby also pulling cord 40 and strap means 50 back inside of handle 20 and plate 46 into position within opening 47.

*Assembly and operation*

This invention is very easy to assemble. The bottoms of legs 21 of handle 20 and props 26 mounted on legs 21 are inserted into the cups 7 mounted on the sides of frame 3 of carriage 1. The bent down portions 12 of the arms 11 of seat 10 are placed within the cups 5 on the rear seat support posts 4, the knobs 14 on the spring detents 13 engaging the small openings 6 in the cup 5, thereby securing the seat to the rear seat support posts. The braces 34 mounted on legs 21 of handle 20 are positioned adjacent the holes 15 in the sides of arms 11 of seat 10. The head 39 of pin 37 is pulled outwardly, tensioning spring 35 within brace 34, allowing end 38 of pin 37 to snap into openings 15 of arms 11 when head 39 is released. This invention is thus completely assembled as a stroller.

When one wishes to convert the stroller into a swing, he can do so, without the use of extra tools, very quickly and very simply. By pressing knobs 14 of spring detents 13, the bent down portions 12 of arms 11 of seat 10 are removed from the rear seat support posts 4 of carriage 1. One is then able to lift the bottoms of legs 21 and props 26 from the cup 7, thus completely freeing the seat 10 and handle 20 from the carriage 1. Seat 10 is detached from handle 20 by pulling the head 39 of pin 37 outwardly, thus removing end 38 of pin 37 from the openings 15 in the sides of arms 11 of seat 10. The handle 20, seat 10, and carriage 1 are now all separated from each other.

By pressing knobs 31 and 31a of spring detents 30 and 30a mounted within legs 21 and props 26 respectively, legs 21 and props 26 can be extended until knobs 31 and 31a engage openings 32 and 32a in the sides of legs 21 and props 26. When the legs and props are thus locked in this extended position, props 26 can be pivoted away from legs 21 until flattened top edges 29 of props 26 bind against the sides of legs 21. Thus a trellis is formed, and it will be noted that this trellis is given added stability and room for a suspended swing seat by means of legs 21 pivoting around pins 24 in grip 22 until flattened bottom edges 25 of horizontal portions 23 of legs 21 bind against the bottom of grip 22. The D-rings 54 are pulled from grip 22, thus drawing cords 40 and strap means 50 out of the handle 20 to a point where disk 45 is locked behind stop 43 of catch 42. D-rings 54 are hooked behind buttons 16 on the arms 11 of seat 10 and rings 55 are hooked on the buttons 17 on the top of the back of seat 10. The swing is then ready to use, the conversion accomplished quickly and easily, without the use of any tools.

When one wishes to convert the swing to a stroller, rings 54 and 55 are released from buttons 16 and 17, thus detaching the seat 10 from the trellis. Upon pressing the buttons 42a of catches 42, the cords 40 and strap means 50 retreat within the handle 20 by means of spring 46 returning to its normal position, the plates 46 fitting into openings 47 of grip 22. Legs 21 and props 26 are placed adjacent each other, spring detents 30 and 30a allowing them to be telescoped to stroller height. The stroller is then assembled as described hereinbefore.

I have described a baby stroller, convertible into a swing, the conversion being accomplished quickly and simply. No tools are necessary for the conversion. All of the connections are safe, sturdy and long lasting. The combination stroller and swing has a pleasing appearance even though it so easily adapts to conversion from one to the other. This invention thus allows one to have a combination baby stroller and swing which anyone can convert from one to the other without great time consumption or experiencing difficulty.

It must be understood that while I have described one embodiment of this invention, various types of carriages, seats, handles, springs, cords, catches, etc. may be used without departing from the spirit and scope of this invention. These other embodiments are included within the spirit and scope of this invention unless the accompanying claims expressly state otherwise.

I claim:
1. A baby stroller, convertible into a swing, comprising: a carriage; a seat detachably mounted on said carriage; a generally inverted U-shaped handle detachably mounted on said carriage; said handle having a member of substantially equal length to said handle pivotally secured to said handle generally near the top of said handle, said handle and said member forming a trellis when said handle is detached from said carriage; and means on said handle for supporting said seat within said trellis formed by said handle and said member when said handle and said seat are detached from said carriage.

2. A baby stroller, convertible into a swing, comprising: a carriage; a seat detachably mounted on said carriage; a generally inverted U-shaped handle detachably mounted on said carriage; said handle having a member of substantially equal length to the legs of said handle pivotally secured to each of the legs of said handle, generally near their tops, said handle and said members thereby adapted to form a trellis when said handle is detached from said carriage; and means on said handle for supporting said seat within said trellis formed by said handle and said members when said handle and said seat are detached from said carriage.

3. A baby stroller, convertible into a swing, comprising: a carriage; a seat detachably mounted on said carriage; a generally inverted U-shaped handle detachably mounted on said carriage; said handle having a member of substantially equal length to the legs of said handle pivotally secured to each of the legs of said handle, generally near their tops, said handle and said members thereby adapted to form a trellis when said handle is detached from said carriage; cords extendable from the grip of said handle; means within said handle to retract said cords within said handle when no force holds them extended therefrom; and means to attach said cords to said seat to suspend said seat within said trellis when said seat and said handle are detached from said carriage and said cords are extended from the grip of said handle.

4. A baby stroller, convertible into a swing, comprising: a carriage; a seat detachably mounted on said carriage; a generally inverted U-shaped handle detachably mounted on said carriage; said handle having a member of substantially equal length to the legs of said handle pivotally secured to each of the legs of said handle, generally near their tops, said handle and said members thereby adapted to form a trellis when said handle is detached from said carriage; said legs of said handle and said members being telescopically extendible, thereby assuring proper height of said trellis when said legs and said members are extended; and means on said handle for supporting said seat within said trellis formed by said handle and said members when said handle and said seat are detached from said carriage.

5. A baby stroller, convertible into a swing, comprising: a carriage; a seat detachably mounted on said carriage; a generally inverted U-shaped handle detachably mounted on said carriage; said handle having a member of substantially equal length to the legs of said handle pivotally secured to each of the legs of said handle, generally near their tops, said handle and said members thereby adapted to form a trellis when said handle is detached from said carriage; said legs of said handle and said members being telescopically extendible, thereby assuring proper height of said trellis when said legs and said members are extended; cords extendible from the grip of said handle; means within said handle to retract said cords within said handle when no force holds them extended therefrom; and means to attach said cords to said seat to suspend said seat within said trellis when said seat and said handle are detached from said carriage and said cords are extended from the grip of said handle.

6. A baby stroller, convertible into a swing, comprising: a carriage; a seat detachably mounted on said carriage; a generally inverted U-shaped handle detachably mounted on said carriage; said handle having a member of substantially equal length to said handle pivotally secured to said handle generally near the top of said handle, said handle and said member forming a trellis when said handle is detached from said carriage; cords extendible from the grip of said handle; means within said handle to retract said cords within said handle when no force holds them extended therefrom; and means to attach said cords to said seat to suspend said seat within said trellis when said seat and said handle are detached from said carriage and said cords are extended from the grip of said handle.

7. A baby stroller, convertible into a swing, comprising: a carriage; a seat detachably mounted on said carriage; a generally inverted U-shaped handle detachably mounted on said carriage; said handle having a member of substantially equal length to said handle pivotally secured to said handle generally near the top of said handle, said handle and said member forming a trellis when said handle is detached from said carriage; said handle and said member being telescopically extendible, thereby assuring proper height of said trellis when said handle and said member are extended; cords extendible from the grip of said handle; means within said handle to retract said cords within said handle when no force holds them extended therefrom; and means to attach said cords to said seat to suspend said seat within said trellis when said seat and said handle are detached from said carriage and said cords are extended from the grip of said handle.

References Cited in the file of this patent

UNITED STATES PATENTS

| | | |
|---|---|---|
| 1,208,109 | Decker | Dec. 12, 1916 |
| 1,346,973 | Padden | July 20, 1920 |
| 1,952,467 | Slee | Mar. 27, 1934 |
| 2,363,619 | Prieto | Nov. 28, 1944 |
| 2,533,019 | Ketcham | Dec. 5, 1950 |
| 2,664,144 | Johnson | Dec. 29, 1953 |
| 2,754,889 | Lovelace | July 17, 1956 |

FOREIGN PATENTS

| | | |
|---|---|---|
| 197,326 | Switzerland | Apr. 30, 1938 |